3,345,452
SINTERED POWDERED METAL CONNECTORS
Maurus C. Logan, Elizabeth, and Howard B. Gibson, Glen
  Ridge, N.J., assignors to The Thomas & Betts Co.,
  Elizabeth, N.J., a corporation of New Jersey
Filed Feb. 27, 1964, Ser. No. 347,829
15 Claims. (Cl. 174—71)

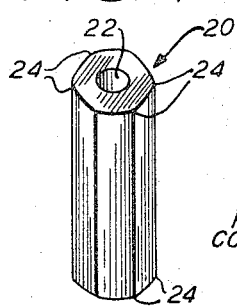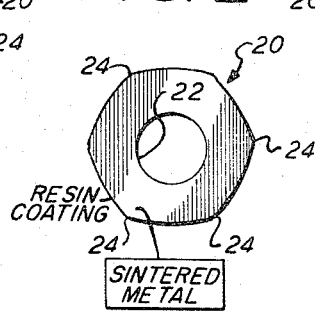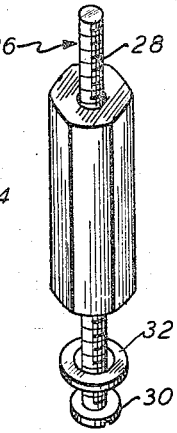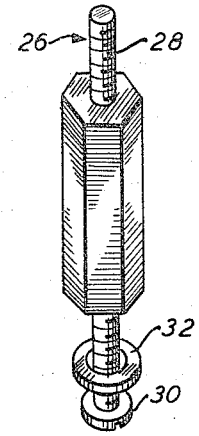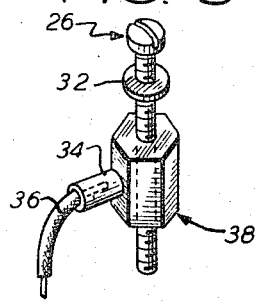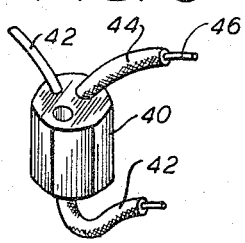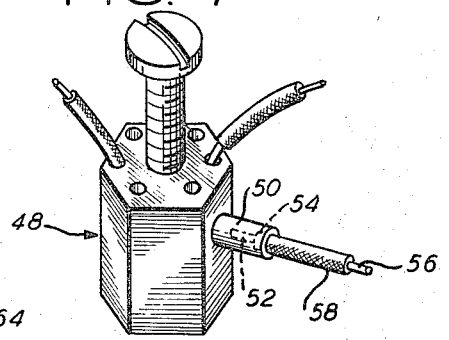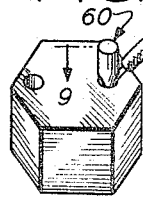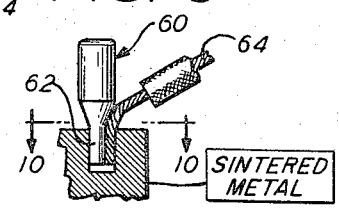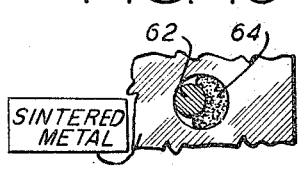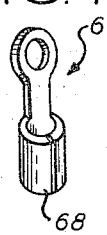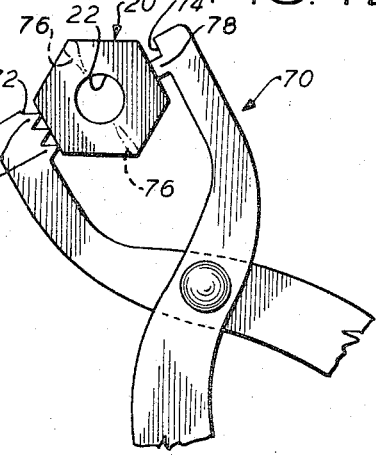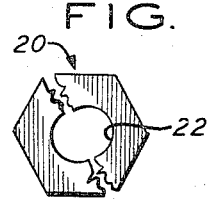
INVENTORS
M. C. LOGAN
H. B. GIBSON
BY
ATTORNEY

United States Patent Office 3,345,452
Patented Oct. 3, 1967

This invention relates, broadly to sintered powdered metal connectors particularly for connecting two or more electrical conductors to each other, such as one or more electrical wires to posts. More particularly, the invention relates to a connector made of sintered powdered metal which is affixed to an adjoining piece under compression and removable therefrom by the creation of tensile forces applied to the connector.

It is known in the prior art to make various articles of sintered powdered metal. It is also known in the prior art to make a connector of granular unsintered metal particles, by compacting the unsintered particles about the ends of two conductors. Furthermore, it is known in the prior art to form threads in the interiors of metal cylinders by forcing a soft metal sleeve, as of copper or aluminum, against threads of a bolt, as well as to form a nut of sintered metal powder. However, in the last instance, the threads of the nut are formed by threading the interior of the sintered structure with a suitable threading tap. However, it is not known in the prior art to compress a preformed sintered powdered metal unit about a conductor to form the connector.

It is an object of the present invention to provide a sintered powdered metal connector applied to an associated object by compressing a preformed sintered powdered metal sleeve about the object.

It is a further object of the invention to provide a connector of powdered sintered metal which can easily be broken away from the object to which it is affixed.

A still further object of the invention is to provide a connector of sintered powdered material of such form as to be capable of being simultaneously affixed to a multiplicity of objects by the use of a simple tool.

A still further object of the invention is to provide an electrical connector of sintered powdered metal.

Yet another object of the invention is to provide an electrical connector of sintered powdered metal which can easily be fractured and broken away from various forms of conductors for ready disruption of an electrical circuit.

Still another object of the invention is to form a connector of preformed sintered powdered metal which is coated with a resin to increase the corrosion resistance of the conductor.

These and other objects will become apparent after considering the following specification, when taken in conjunction with the accompanying drawing in which:

FIG. 1 represents a hollow cylinder of sintered powdered metal.

FIG. 2 is a plan view of the cylinder of FIG. 1.

FIG. 3 represents the same cylinder with a screw loosely positioned therein.

FIG. 4 represents the same cylinder after radial compressive forces applied to the cylinder have compacted the sintered material and furthermore have compacted the sintered material against and into the threads of the screw.

FIG. 5 shows a modified form of connector including a lateral connection with the bared end of an insulated conductor.

FIG. 6 shows still another form of connector in which no screw element is employed but conductors are joined to the sintered connector by insertion into parallel axial openings in the connector and by subsequent compression of the sintered connector about the conductors.

FIG. 7 shows still another modification wherein one of the junctions to a conductor includes a screw and other junctions utilize openings in the sintered connector, one of the conductors being shown with its insulating sheath secured in a lateral sintered formation on the connector.

FIG. 8 shows a modified form of joint between a connector and its associated conductor.

FIG. 9 on an enlarged scale, is a section on the line 9—9 of FIG. 8.

FIG. 10 is a section on the line 10—10 of FIG. 9.

FIG. 11 shows another form of connector which may be made of sintered powdered metal.

FIG. 12 shows the application of a tool to a connector to create tensile forces in the connector to cause fracture thereof and FIG. 13 shows in plan view a fractured connector resulting from the use of the tool illustrated in FIG. 12.

Odinarily wire connections are made by soldering. One of the main drawbacks of a soldered connection is the fact that it is very difficult to control the quality of such connections. It is very desirable to replace soldered connections with connections in which the wires, or the posts and the wires, are connected with each other by mechanical means. One method of producing a mechanical connection is to slip a sleeve of wrought metal around the pair of wires which are to be connected and to crimp the sleeve and the wires together with a suitable tool. By proper design such connections can be made almost foolproof electrically. However, such mechanical connections involving a sleeve are permanent connections and are difficult to take apart. When an attempt is made to cut the sleeve so that the wires which were connected would become loose again, it would generally be found that the ends of the wires would be cut also and would become useless for making a new connection. In contrast to this, by means of this invention wires and posts may be connected together in such a way that not only is a good electrical connection produced, but at the same time the connector can be broken apart without cutting, splitting or destroying the wires or other parts which were connected thereto. For this purpose a connector is used which is made of a metal powder compact. The fabrication of such a metal powder compact connector can be controlled in such a way that the connector can be readily crimped around the wires to be connected, but, on the other hand, it can be cracked open without at the same time cutting or destroying the ends of the wires which were connected. The important property of the metal powder compact which distinguishes it from a wrought metal sleeve is its compressive-tensile loading characteristics. What is needed is a metal compact which is ductile enough so that it deforms during the crimping operation, when it is primarily subjected to compressive stresses, but has, on the other hand, a sufficient lack of ductility, or it does have a degree of frangibility so that it will break into pieces when an attempt is subsequently made to flatten it between plier jaws.

For a more complete understanding of the invention, reference is made to the accompanying drawing. In FIG. 1 there is illustrated a hollow cylinder 20 of sintered powdered metal. This cylinder may have an axial bore 22 and an outer wall. Particularly where it is finally desired to have a hexagonal exterior wall, the cylinder is configurated to provide a generally hexagonal outer wall with rounded corners as indicated at 24, for a purpose to be explained. The sintered material may be of any metal desired depending on the use to which the connector may be put. Thus it may be comprised wholly of iron particles, if the connector be used as a nut for a bolt. Or, if greater conductivity be desired, as for use as part of an electrical circuit, the connector may be comprised of any mixture of iron or other more conductive materials, as bronze or copper. Preferably, to make the connector very conductive and more suitable in application to a conductor and more frangible under tensile forces, the sintered material is made from materials comprised of a mixture of copper powders, a maximum of 60% of which is smaller than 325 mesh and the remainder of which is smaller than 150 mesh, thoroughly blended. This mixture is introduced into a die cavity and through the actions of a punch pressed so tightly within the cavity that the powder compacts and adheres into a fairly unitary mass and will readily hold together when removed from the mold. If the compacting pressure is too low, for instance, if the compacting is below 20,000 pounds per square inch for a copper powder compact, the compact will have insufficient strength so that it cannot be readily handled between the compacting and the sintering operation. On the other hand, if the compacting pressure is too high an unsatisfactory compact may also be produced. With very high compacting pressures of 80,000 p.s.i. and more a very dense green compact would be produced. If this very dense compact were made from a very well reduced powder, it would then produce a very dense sintered compact. Such a very dense sintered compact would be too ductile so that it would behave like a part made from wrought metal and could not readily be broken into pieces if it were desired to open the connection between the wires. On the other hand, if the very dense, green compact were made from a powder which contained oxide at the surface of the powder particles, the compact would swell during the sintering treatment and it would be impossible to control the dimensions of the compact during the sintering. This explains why in the production of a connector from metal powder a carefully controlled compacting pressure would have to be used. By controlling the compacting pressure, the green density and also the sintered density of the compact would be controlled. The control of the sintered density of the compact would be the most important factor in controlling the ductility of the compact, making it neither too brittle for crimping nor too ductile so that it can be readily removed, if this be desired. An optimum pressure would be substantially at 60,000 p.s.i. The optimum mixture is one where the particles passing through the 325 mesh screen is substantially 10% of the mixture and the remainder of the particles are substantially such as will pass a 150 mesh screen but not a 200 mesh screen. The condition is such that the green unsintered compact achieves 98% of theoretical maximum density of the connector to be formed. Theoretical maximum density is the ratio of the density to which metal powder particles can be practically compressed to the density of a similar mass of solid non-porous metal of the same composition, the ratio being expressed in a percent value. Notwithstanding the compacting of the particles, the green compact has very little strength and if dropped onto the floor, it would shatter and it can be crushed between the fingers. To render the mass useable, the compact is sintered in a reducing atmosphere, as propane, hydrogen or wet ammonia. The optimum pressure and sintering atmosphere should be sufficiently reducing and dry (−30° F. dew point) so that any oxide which exists on the surface of the metal powder particle would be reduced during the sintering treatment. Both sintering time and sintering temperature are important in the control of the density of the sintered compact and of the ductility of the sintered compact. In general, it will be observed that the higher the sintering temperature and the longer the sintering time, the more ductile would be the sintered compact and the greater would be the sintered density. The sintering temperature should be in the range between 1700 and 1950 degrees Fahrenheit with the mid-temperature as the preferred temperature; the sintering time should be in the range between 15 minutes and one hour, preferably an hour, and the sintering atmosphere should be hydrogen, dissociated ammonia or partially combusted hydrocarbon gas such as methane or propane, the preferred reducing atmosphere being the propane. The resulting product even though compacted, is porous and can withstand considerable compressive forces when applied circumferentially about a threaded or other configurated stud, but the sintered compact cannot tolerate very much tensile loading, as will be referred to later on in this description.

It is now easy to see the advantages of a connector made from the described metal powder compact. On the one hand a connector made in accordance with the invention will make an excellent connection between wires because it can be readily crimped around two or more wires, and will make a connection which will withstand much abuse to which it may be subjected. Such a connection will be much more reliable than will be a soldered connection. On the other hand, a connector of the invention can be removed without deleteriously affecting the ends of the wires which were connected. Therefore, when it is desired to open a connection in an electrical circuit, and to establish a new connection, this new connection can be made with the existing ends of the wires.

When the connector is a screw type connector, the interior bore may be threaded and joined to a configurated object in one operation, as follows: Assume that the surface configurated object is a bolt, here indicated as 26, having threads 28 and a screw driver engageable head 30. A washer 32 or washers may additionally be slipped over the bolt to better hold the end of a conductor coupled to the connector. The bolt is inserted within the bore of the cylinder, without threading the bolt into the connector. For this purpose, the bore in the connector initially is made larger than the diameter of the threaded portion of the bolt. For example, were the major diameter of the threaded portion of the bolt to be .117 inch, the bore would be made to have diameter of .119 inch, and preferably the diameter of the cylinder would be more than twice the diameter of the bore in the cylinder, as .260 inch. If now the cylinder be squeezed radially from all sides inwardly toward the screw, as by a hexagon faced pair of pliers to which the outer face of the cylinder initially roughly conforms, compressive forces would be applied to the cylinder, compressing the particles slightly toward each other and causing the interior wall of the cylinder to flow into the threads of the bolt. The exterior of the cylinder would then partake of the shape of the faces of the pliers and become hexagonal. Due to the manner of application of the cylinder to the bolt, not only is a threaded structure formed interiorly of the cylinder, but it binds tightly against the threads of the bolt, making a tight fit between the cylinder (now in the form of a nut) and the bolt. This action seems to be due not only to the interfit of threads but to the minutely pitted nature of the sintered material of the nut, which causes a more effective binding action than were threads cut into the cylinder by threading the cylinder with a tap.

If desired, an air and moisture impervious resinous coating may be applied to the connector to prevent corrosion of the connector. This coating may be applied to any of the connectors of the type disclosed herein.

In FIG. 5 there is shown, in addition to the threaded bolt, a form of connector involving the use of an integrally formed sleeve 34 of sintered powdered metal which may be compressed about a wire 36, or the bared end of a conductor, at the same time that the sintered powdered metal cylinder 38 is compressed about the bolt 26. As illustrated in FIG. 5, the cylinder need not be of considerable elongation, any length of cylinder, in accordance with need, being operative. Indeed, as illustrated in FIG. 6, it is not essential in the formation of the frangible connector of this invention that the cylinder be hollow or provided with a threaded interior portion. As illustrated in FIG. 6, the sintered powdered cylinder 40 may be provided with apertures extending longitudinally of the cylinder, into which are snugly fitted the bared ends of wires or conductors, as conductors 42, or the bared end and adjoining insulating covering portion 44 of a conductor 46 and which cylinder may be compressed about the wires. Where the hexagonal outside configuration of the cylinder is unimportant, the cylinder which initially may have had the exterior wall configuration of FIG. 2, may be compressed by a tool having a pair of semicircular jaw openings to form a substantially cylindrical outer wall on the connector, as on the cylinder 40.

In FIG. 7 there is illustrated another form of the invention in which the connector cylinder 48 embodies the screw or bolt formation of FIG. 4, the conductor engaging characteristics of FIG. 6 and a modified form of lateral projection in which the sleeve 50 is of two internal diametered portions 52 and 54, to engage the conductor 56 and its covering 58. This last construction is like the construction of cylinder 40 in FIG. 6 which has two diametered portions to engage the conductor 44 and its covering 46.

In FIGS. 8, 9 and 10 there is illustrated a modified form of connection between a bared wire and the cylinder. In order to secure a still more firm connection between the wire and connector there is employed an additional pin 60 of material harder than the cylinder and conductor. For convenience in handling, the pin is bottle shaped, that is, it includes a neck-down portion 62 which is smaller than the opening in the connector and said neck-down portion 62 and bared end of the wire 64 snugly fitting in the opening in the sintered powdered metal cylinder. Upon compression of the cylinder particularly when the conductor is made of stranded wire, there are formed wavy portions in the end of the conductor and adjoining walls of the cylinder somewhat sinusoidal in shape, and which form a very tight connection of the wire with the connector. The sinusoidal formation, besides effecting a better mechanical connection between the conductor and connector, affords a better electrical connection because during the bending of the wire there is a breaking away and disruption of oxides on the surface of the conductor resulting in a more intimate electrical contact between the conductor itself and the connector.

In FIG. 11 there is illustrated a common form of connector 66 which can be made of sintered powdered copper. The sleeve 68 of the connector may be readily secured to a conductor by uniformly circumferentially compressing the sleeve 68 about the connector however, opposed pressures on the sleeve portion will readily crack the connector.

All forms of the sintered connector are capable of being quickly broken away from the bolt or conductors by a tensile force applied to the cylinder. One means for attaining the rupturing of a connector of the type set forth herein is illustrated in FIG. 12. A tool, as pliers 70, has opposing faces 72 and 74 which when applied with pressure to opposing portions of the cylinder will cause disruptive tensile forces to exist in the cylinder. The cylinder, when sufficient force is applied to the pliers, will then fracture, as typified in FIG. 13. For greater effectiveness, one of the plier faces may have a nib formation 78 to localize the compressive force, and the other face may be ribbed as indicated at 80. Thus, by reason of the nature of the material of the connector, it is easy to assemble a conductor as in the form of a screw, or bolt, or wire, or band of wires, with the connector, and it is very easy to obtain a quick disconnection of parts by fracturing the sintered connector.

It is obvious that the connectors and method previously disclosed herein are merely exemplary of various forms of which the invention may partake. It is therefore intended that the claims herein cover all structure which fall within the language of the claims.

Having thus described the invention, what is claimed is:

1. A connection between a conductor and a connector, being preformed of a sintered powdered metal and having an opening therein, and a conductor disposed in said opening, said connector being circumferentially compressed about said conductor to form an electrical connection therewith.

2. A connection between an object and a connector, said connector being preformed of a sintered powdered metal in the form of a nut and being tightly compressed circumferentially about said object, and said object being threaded with the threads engaged by threads formed in the nut.

3. A connection between a plurality of objects and a connector, said connector being formed of a preformed sintered powdered metal and having apertures therein and said objects having portions respectively located in said apertures, said connector being squeezed in tight holding relationship about said portions of said objects.

4. A connection between a connector and conductors, said connector being comprised of sintered powdered metal having a first conductor tightly engaged in an aperture in the connector and an integral lateral sleeve of sintered powdered metal projecting from the connector tightly engaging the end of a second conductor.

5. A connection between a connector and a conductor, said connector being comprised of sintered powdered metal and having a screw thread threadedly engaged with said conductor, the material of the connector being compressed about said conductor, and an integral lateral sleeve of sintered powdered metal projecting laterally from the connector with the material of the sleeve compressed about the end of said conductor.

6. A connection between a connector and a wire, said connector being comprised of sintered powdered metal with an aperture therein, a pin and a wire inserted within said aperture, and said sintered metal of the connector being compressed about the pin and wire.

7. The structure of claim 6 wherein the wire is stranded.

8. The structure of claim 6 wherein the pin includes a neck-down portion inserted into the aperture.

9. A connector for forming an electrical connection with at least one electrical conductor comprising a body of sintered powdered metal particles having an aperture in said body for receiving at least one electrical conductor therein, said powdered metal particles having been compacted by the application of pressure thereto prior to sintering, said body having predetermined compressive-tensile loading characteristics determined by the properties of said body which include (a) a degree of ductility under compression which results in substantial circumferential reduction of said body about the aperture to effect the connection to a conductor in response to the application of circumferential compression about the aperture in said body and without failure of said body under compression, and (b) a degree of frangibility under tension which results in rupturing of said body upon application of disruptive tensile force thereto after substantial circumferential reduction of said body under circumferential compression, whereby said body is engageable with at least one conductor to form an electrical connection therewith upon application of a circumferentially applied compressive load and frangible upon application of subsequent disruptive tensile force to separate said body from the engaged conductor without rendering the conductor unfit for reuse.

10. A sintered powdered metal connector as set forth in claim 9 wherein said connector further has a resinous coating thereabout.

11. A connector as set forth in claim 9 wherein said sintered powdered metal comprises metal powder particles having been compacted by a pressure greater than 20,000 p.s.i. and less than 80,000 p.s.i., a portion of said metal particles being of a size which will pass through a 325 mesh screen and the remainder of said metal particles being of larger particle size which will pass through a 150 mesh screen, said portion being in a range from between 10% to 60% of said metal particles.

12. A connector as set forth in claim 9 wherein said sintered powdered metal comprises copper powder particles having been compacted by a pressure greater than 20,000 p.s.i. and less than 80,000 p.s.i., a portion of said copper particles being of a size which will pass through a 325 mesh screen and the remainder of said copper particles being of larger particle size which will pass through a 150 mesh screen, said portion being in a range from between 10% to 60% of said copper particles.

13. A connector as set forth in claim 9 wherein said body has an aperture extending completely therethrough for receiving at least one electrical conductor within said aperture.

14. A method of making an electrical connector for an electrical connection which comprises the steps of: (1) blending electrical conductive metal powder to form a blend, a portion of said powder being between 10% and 60% of said powder and having a particle size which will pass through a 325 mesh screen, and the remainder of said powder being of a larger particle size which will pass through a 150 mesh screen, said powder being selected from the group including copper, iron and bronze; (2) compacting the blend by applying pressure thereto of greater than 20,000 p.s.i. and less than 80,000 p.s.i. to produce a green compact; (3) sintering said green compact in a reducing dry atmosphere at a temperature of between 1700 and 1950° F. for a period extending from 15 minutes to one hour to produce a porous sintered product which can withstand considerable compressive force without failure upon being substantially reduced circumferentially in response to circumferential compression thereabout but which will rupture if subjected to substantial disruptive tensile forces.

15. A preformed connector comprising a body of sintered powdered metal having at least one longitudinally disposed aperture for receiving electrical conductors and at least one transversely disposed sleeve having an aperture for receiving electrical conductors, said body having a ductility enabling said body to be substantially reduced circumferentially about each of said apertures to intimately engage the conductors therein in response to circumferential compression thereabout without failure in compression when forming an electrical connection and being frangible upon application of disruptive tensile forces which enables said body to be broken away from the connected conductors without damage to the conductors upon subsequent application of disruptive tensile forces.

References Cited
UNITED STATES PATENTS

| | | | |
|---|---|---|---|
| 1,989,186 | 1/1935 | De Bats | 29—182.5 X |
| 2,549,939 | 4/1951 | Shaw et al. | 29—420.5 X |
| 2,707,775 | 5/1955 | Hoffman et al. | 174—94 |
| 3,145,261 | 8/1964 | Forney | 174—71 |
| 3,189,988 | 6/1965 | Crane | 29—420.5 |
| 3,204,158 | 8/1965 | Schreiner et al. | 317—234 |
| 3,214,651 | 10/1965 | Van Dyck et al. | 317—234 |
| 3,226,814 | 1/1966 | Leib et al. | 29—420.5 |

DARRELL L. CLAY, *Primary Examiner.*

LEWIS H. MYERS, *Examiner.*

UNITED STATES PATENT OFFICE

CERTIFICATE OF CORRECTION

Patent No. 3,345,452　　　　　　　　　　　　　　　October 3, 1967

Maurus C. Logan et al.

It is certified that error appears in the above identified patent and that said Letters Patent are hereby corrected as shown below:

Column 6, line 14, cancel "connector, said connector being formed of a preformed" and insert -- preformed connector, said connector being formed of a --.

Signed and sealed this 20th day of January 1970.

(SEAL)
Attest:

Edward M. Fletcher, Jr.　　　　　　　　　　　　WILLIAM E. SCHUYLER, JR.
Attesting Officer　　　　　　　　　　　　　　　　　Commissioner of Patents